US010167873B2

(12) United States Patent
Sheridan et al.

(10) Patent No.: US 10,167,873 B2
(45) Date of Patent: Jan. 1, 2019

(54) DUAL DIRECTION WINDMILL PUMP FOR GEARED TURBOFAN ENGINE

(71) Applicant: United Technologies Corporation, Hartford, CT (US)

(72) Inventors: William G. Sheridan, Southington, CT (US); Reade W. James, West Hartford, CT (US); Jacob Peter Mastro, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 348 days.

(21) Appl. No.: 15/021,293

(22) PCT Filed: Jul. 23, 2014

(86) PCT No.: PCT/US2014/047795
§ 371 (c)(1),
(2) Date: Mar. 11, 2016

(87) PCT Pub. No.: WO2015/060912
PCT Pub. Date: Apr. 30, 2015

(65) Prior Publication Data
US 2016/0222975 A1    Aug. 4, 2016

Related U.S. Application Data

(60) Provisional application No. 61/879,808, filed on Sep. 19, 2013.

(51) Int. Cl.
*F01D 25/20* (2006.01)
*F04D 29/063* (2006.01)
(Continued)

(52) U.S. Cl.
CPC ........... *F04D 29/063* (2013.01); *F01D 21/00* (2013.01); *F01D 25/20* (2013.01); *F02C 7/32* (2013.01);
(Continued)

(58) Field of Classification Search
CPC .. F01D 25/20; F01D 15/12; F02C 7/32; F02C 7/36; F16H 3/003
(Continued)

(56) References Cited

U.S. PATENT DOCUMENTS 3,994,634 A    11/1976   Riddle et al.
5,494,421 A    2/1996    Wada et al.
(Continued)

OTHER PUBLICATIONS

European Search Report for European Patent application No. 14856564.1 dated Mar. 29, 2017.
(Continued)

*Primary Examiner* — Jason Shanske
*Assistant Examiner* — Behnoush Haghighian
(74) *Attorney, Agent, or Firm* — Carlson, Gaskey & Olds, P.C.

(57) ABSTRACT

A lubrication system includes a shaft rotatable about an axis, a lubrication pump configured to supply a lubricant flow to a gear system, and a gear train coupled to the shaft and configured to drive the lubrication pump in a first direction responsive to rotation of the shaft in both the first direction and a second direction. A gas turbine engine and method are also disclosed.

17 Claims, 3 Drawing Sheets

(51) Int. Cl.
  *F02C 7/32*   (2006.01)
  *F01D 21/00*  (2006.01)
  *F04D 19/00*  (2006.01)
  *F04D 25/02*  (2006.01)
  *F04D 25/04*  (2006.01)
  *F04D 29/053* (2006.01)
  *F04D 29/32*  (2006.01)
  *F01D 15/12*  (2006.01)
  *F16H 3/00*   (2006.01)
  *F16H 57/04*  (2010.01)

(52) U.S. Cl.
  CPC ......... *F04D 19/005* (2013.01); *F04D 25/028* (2013.01); *F04D 25/045* (2013.01); *F04D 29/053* (2013.01); *F04D 29/325* (2013.01); *F01D 15/12* (2013.01); *F05D 2260/4031* (2013.01); *F16H 3/003* (2013.01); *F16H 57/04* (2013.01)

(58) Field of Classification Search
  USPC ...................................................... 74/810.1
  See application file for complete search history.

(56) References Cited

U.S. PATENT DOCUMENTS

| | | | |
|---|---|---|---|
| 6,312,215 B1 | 11/2001 | Walker | |
| 7,621,117 B2 | 11/2009 | Dooley et al. | |
| 7,662,059 B2 | 2/2010 | McCune | |
| 7,849,668 B2 | 12/2010 | Sheridan | |
| 8,113,317 B2 | 2/2012 | Delaloye | |
| 8,365,866 B2 | 2/2013 | Ciszak et al. | |
| 8,657,714 B1 | 2/2014 | Ghanime et al. | |
| 8,702,373 B1 | 4/2014 | Valva et al. | |
| 9,163,531 B2 * | 10/2015 | Su | F01L 1/146 |
| 2007/0113703 A1 * | 5/2007 | Himmelmann | F16H 37/065 74/661 |
| 2010/0018808 A1 * | 1/2010 | Gloge | F16H 61/0031 184/6.12 |
| 2010/0086403 A1 | 4/2010 | McCune | |
| 2013/0098059 A1 * | 4/2013 | Suciu | F02C 9/16 60/783 |

OTHER PUBLICATIONS

International Search Report and Written Opinion for International Application No. PCT/US2014/047795 dated May 28, 2015.

International Preliminary Report on Patentability for International Application No. PCT/US2014/047795 dated Mar. 31, 2016.

\* cited by examiner

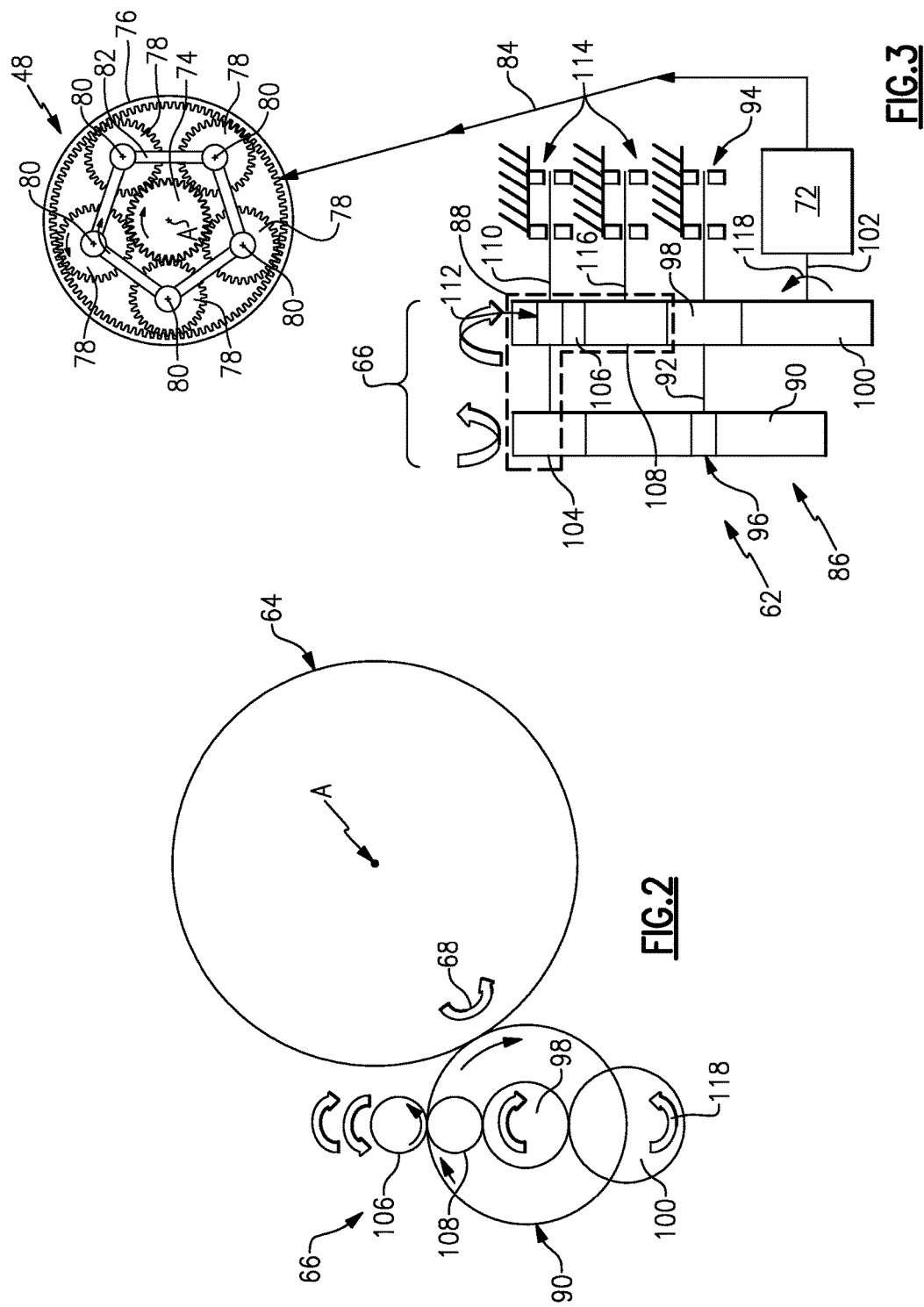

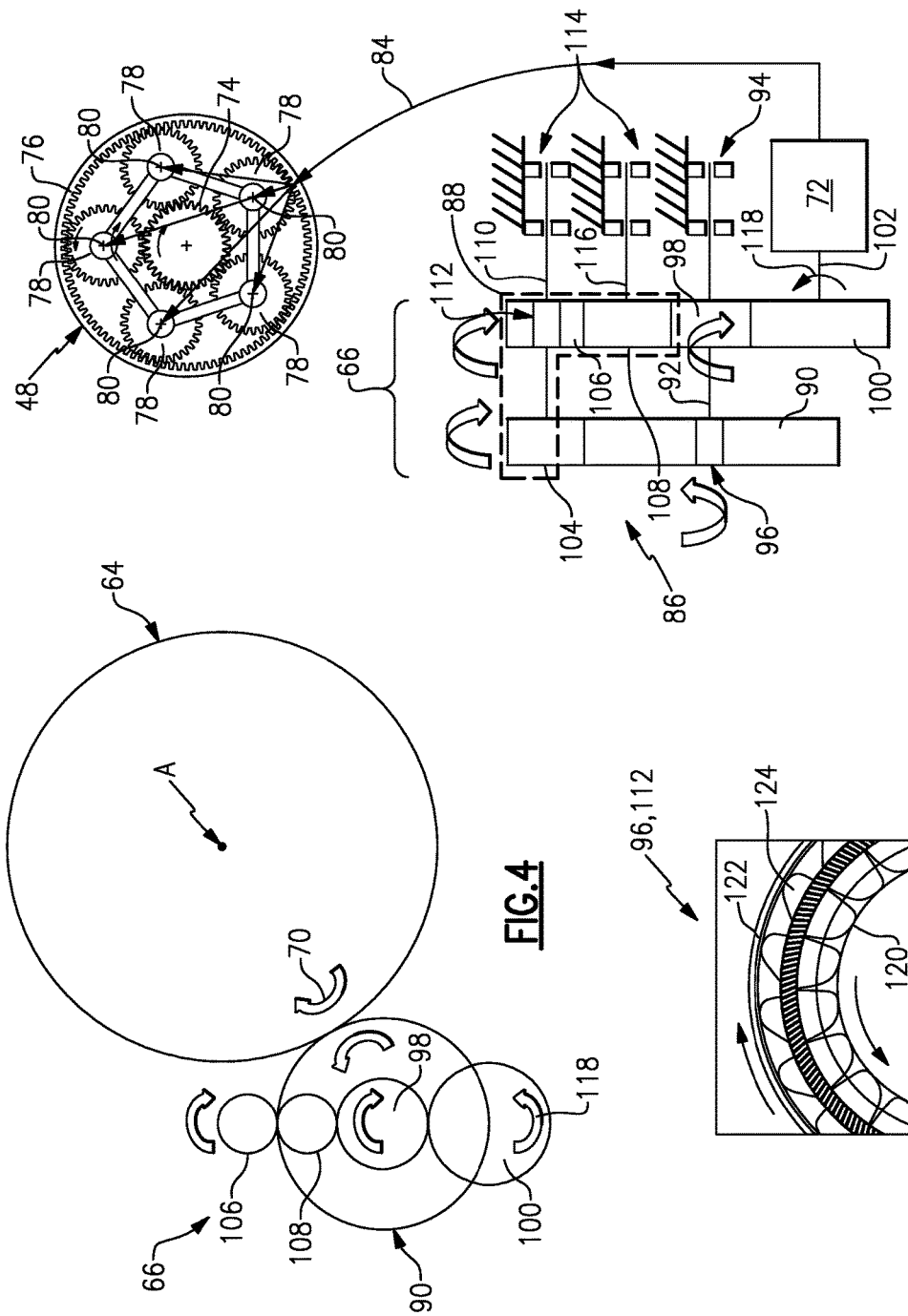

DUAL DIRECTION WINDMILL PUMP FOR GEARED TURBOFAN ENGINE

CROSS REFERENCE TO RELATED APPLICATION

This application claims priority to U.S. Provisional Application No. 61/879,808 filed on Sep. 19, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Air moving through a non-operating gas turbine engine may rotate (i.e., windmill) the fan of the gas turbine engine. In some examples, the gas turbine engine is one of a group of engines that propels an aircraft during flight, and windmilling occurs if the gas turbine engine shuts down during flight. In other examples, wind moving though a gas turbine engine on the ground may cause windmilling Even though the engine is not operating, rotation of the fan and the corresponding gear assembly may require lubricant.

SUMMARY

A lubrication system according to an exemplary embodiment of this disclosure, among other possible things includes a shaft rotatable about an axis, a lubrication pump configured to supply a lubricant flow to a gear system, and a gear train coupled to the shaft and configured to drive the lubrication pump in a first direction responsive to rotation of the shaft in both the first direction and a second direction.

In a further embodiment of any of the foregoing lubrication systems, the input gear train includes a primary gear train that drives the lubrication pump when the shaft rotates in the first direction and a reverse gear train that drives the lubrication pump when the shaft rotates in the second direction.

In a further embodiment of any of the foregoing lubrication systems, the shaft includes a shaft gear engaged for driving the input gear train.

In a further embodiment of any of the foregoing lubrication systems, the primary gear train includes a primary gear coupled to drive a primary gear shaft responsive to rotation of the shaft in the first direction and decoupled from the primary gear shaft responsive to rotation of the shaft in the second direction.

In a further embodiment of any of the foregoing lubrication systems, includes a primary overrunning clutch configured to couple the primary gear to the primary gear shaft during rotation in the first direction.

In a further embodiment of any of the foregoing lubrication systems, includes a pinion gear coupled to the primary gear shaft, the pinion gear configured to drive the lubrication pump.

In a further embodiment of any of the foregoing lubrication systems, the reverse gear train includes a reverse gear coupled to a reverse gear shaft responsive to rotation of the shaft in the second direction and decoupled from the reverse gear shaft responsive to rotation of the shaft in the first direction.

In a further embodiment of any of the foregoing lubrication systems, includes a reverse overrunning clutch for coupling the reverse gear to the reverse gear shaft during rotation of the shaft in the second direction.

In a further embodiment of any of the foregoing lubrication systems, includes a reverse idler gear driven by the reverse gear and configured to drive the lubrication pump.

In a further embodiment of any of the foregoing lubrication systems, the lubrication pump includes one of a gear pump, gear rotor pump, and a vane pump.

In a further embodiment of any of the foregoing lubrication systems, the gear system includes at least one gear supported by a journal bearing.

A gas turbine engine according to an exemplary embodiment of this disclosure, among other possible things includes a geared architecture, a shaft configured to rotate about an axis and drive the gear architecture, a lubrication pump configured to supply a lubricant flow to the geared architecture, and an input gear train coupled to the shaft and configured to drive the lubrication pump in a first direction responsive to rotation of the shaft in both of the first direction and a second direction.

In a further embodiment of any of the foregoing gas turbine engines, rotation of the shaft in a non-powered condition of the gas turbine engine drives the geared architecture in one of the first direction and the second direction.

In a further embodiment of any of the foregoing gas turbine engines, the input gear train includes a primary gear train that is configured to drive the lubrication pump when the shaft rotates in a clockwise direction and a reverse gear train that drives the lubrication pump when the shaft rotates in a counter-clockwise direction.

In a further embodiment of any of the foregoing gas turbine engines, the primary gear train includes a primary gear coupled to drive a primary gear shaft through a primary clutch responsive to rotation of the shaft in the first direction and decoupled from the primary gear shaft responsive to rotation of the shaft in the second direction.

In a further embodiment of any of the foregoing gas turbine engines, the reverse gear train includes a reverse gear coupled to a reverse gear shaft through a reverse clutch responsive to rotation of the shaft in the second direction and decoupled from the reverse gear shaft responsive to rotation of the shaft in the first direction.

In a further embodiment of any of the foregoing gas turbine engines, the shaft is in communication with a fan, and the shaft rotates in each of the first direction and the second direction responsive to the fan windmilling.

A method of lubricating a geared architecture according to an exemplary embodiment of this disclosure, among other possible things includes rotating a shaft, driving a lubricant pump responsive to the rotating, and generating a lubricant flow with the lubricant pump to portions of a gear system. The lubricant pump generates the lubricant flow responsive to the shaft rotating in either direction.

In a further embodiment of any of the foregoing methods, includes rotating a gear, the gear driving the lubricant pump and rotating in one direction independent of rotational direction of the shaft.

In a further embodiment of any of the foregoing methods, includes directing lubricant flow from the lubricant pump to at least one journal bearing.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a schematic illustration of an example input gear system, according to an embodiment.

FIG. 3 is a schematic view of an example lubrication system, according to an embodiment.

FIG. 4 is another schematic view of example input gear system, according to an embodiment.

FIG. 5 is another schematic view of another gear lubrication system, according to an embodiment.

FIG. 6 is a schematic view of an example sprag clutch assembly, according to an embodiment.

DETAILED DESCRIPTION

Figure 1:
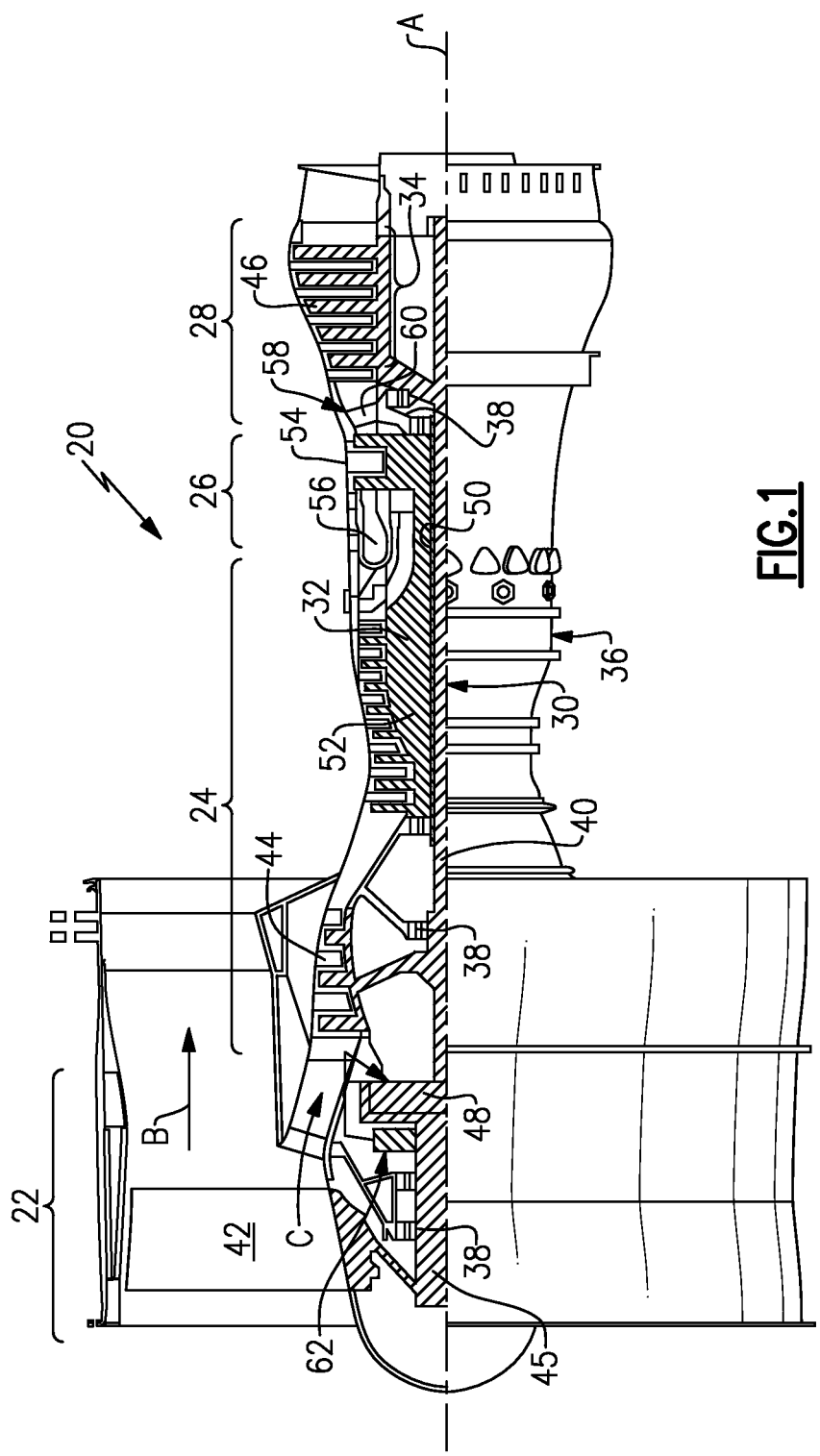
FIG. 1 is a schematic view of an example gas turbine engine, according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350 m/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The example gas turbine 20 includes a lubrication system 62 that provides lubricant to the geared architecture 48 during non-engine operating conditions. During non-engine operating conditions such as when an aircraft is on the ground, or if the engine is off during flight, air flow through the fan blades 42 can cause rotation of the fan and thereby back driving of the geared architecture 48. In some instances, rotation of the fan 42 can be of a speed which may result in significant rotation of the geared architecture 48. It is preferable to provide lubricant flow to the geared architecture 48 in all instances where it is rotating.

Accordingly, the example gas turbine engine 20 includes a lubrication system 62 that is driven by rotation of the fan 42 to provide lubricant flow to the geared architecture 48.

Referring to FIGS. 2 and 3, the example lubrication system 62 is driven by an input gear train 66. The input gear train 66 is driven by a shaft gear 64. The shaft gear 64 is a gear that is disposed on a fan shaft 45 driven by the geared architecture 48 during normal engine operating conditions.

When the engine is in a non-operating condition, the fan 42 will drive the fan shaft 45 and thereby the shaft gear 64. The back driving of the shaft gear 64 also results in rotation of the geared architecture 48. The example lubricant systems 62 includes the input gear train 66 that drives a lubricant pump 72 that generates a lubricant flow 84 that is communicated to the geared architecture 48.

The example input gear train 66 includes a primary gear train 86 and a reverse gear train 88. The primary gear train 86 includes a primary gear 90 driven by the shaft gear 64. The primary gear 90 is supported on a primary gear shaft 92 that is in turn supported by bearing assemblies 94. Also supported on the primary gear shaft 92 is a pinion gear 98. The pinion gear 98 is fixed to rotate with the gear shaft 92 and is coupled to a pump shaft gear 100. The pump shaft gear 100 is in turn supported on a pump shaft 102 to drive the lubricant pump 72.

The reverse gear train 88 includes a first reverse gear 104 engaged to the primary gear 90. The first reversing gear 104 is supported on a reverse gear shaft 110 that also supports a second reversing gear 106. Accordingly, the primary gear 90 will drive the first reversing gear 104 and thereby the reversing gear shaft 110. The second reversing gear is selectively coupled to the reverse gear shaft 110 such that it will rotate with the shaft 110 only in one desired direction.

Disposed between the second reversing gear 106 and the pinion gear 98 is a reverse idler gear 108 that is supported on a reverse pinion shaft 116. The shaft 110 and shaft 116 are each supported by bearing assemblies 114. As appreciated, all of the gears of the input gear train 66 are engaged with each other and will all turn in all instances where the shaft gear 64 is rotating. However, the primary gear 90 and the second reversing gear 106 are each selectively coupled to the corresponding shaft 92 and 110 respectively. The primary gear 90 is coupled to the primary gear shaft 92 through a clutch 96. Accordingly, the primary gear 90 will transmit rotation to the primary gear shift 92 only when rotating in one direction. Rotation in a second, opposite the first direction, will not transmit rotation to the primary gear shaft 92. Thereby, because the primary gear 90 does not transmit rotation to the primary gear shaft 92 in the second direction and the pinion gear 98 will not be driven by the primary gear 90.

The second reverse gear 106 is coupled to the reverse gear shaft 110 through a reverse clutch 112. Accordingly, rotation of the first reversing gear 104 that drives the reverse gear shaft 110 will only result in driving rotation of the second reversing gear 106 in one direction that is opposite of the direction in which the primary gear 90 will transmit rotation to the primary gear shaft 92.

In operation, rotation of the shaft gear 94 in a first direction indicated at 68 (FIG. 2) will result in rotation of the primary gear 90 in a direction that engages the clutch 96 to the shaft 92 to thereby transmit rotation to the pinion gear 98. Rotation of the pinion gear 98 will in turn drive the pump shaft gear 100 to rotate or drive the lubricant pump 72.

Rotation in this first direction 68 will not cause torque to be transferred through the reverse gear train 88. Rotation of the primary gear 90 will drive the first reversing gear 104 and thereby the reversing gear shaft 110. However, rotation of the second reverse gear 106 in a direction corresponding with the first direction 68 as is illustrated in FIGS. 2 and 3 will result in the reverse clutch 112 not engaging the reverse gear shaft 110. Accordingly, the second gear 106 will not transmit torque to the reverse idle gear 108 and therefore not provide the driving torque required to power the lubricant pump 72.

The lubricant pump 72 will generate a lubricant flow 84 that is directed to the geared architecture 48. In this example, the geared architecture 48 includes a sun gear 74 that is circumscribed by a plurality of intermediate gears 78 supported by a carrier 82 and engaged with a surrounding ring gear 76. In this disclosed example, each of the intermediate gears 78 are supported on a journal bearing 80. The journal bearing 80 requires lubricant flow during all times to prevent undesired wear during wind milling and the resulting non-powered rotation of the geared architecture 48. It should be understood, that although a geared architecture for driving a fan is disclosed, it is within the contemplation of this disclosure to utilize the example lubrication system for other engine and systems requiring lubrication in non-powered engine conditions.

Traditional lubricant pump gear trains power the lubricant pump such that lubricant flow is provided when the fan shaft 45 (FIG. 1) moves in one direction. It has been determined that airflow can cause the fan shaft 45 to rotate in an opposite direction (windmill) and thereby not provide the desired lubricant flow to the geared architecture 48. In such instances, it is required to provide a brake or other mechanism to prevent back driving of the geared architecture 48. However, such mechanisms are undesirable as they are cumbersome and can hinder desired maintenance operations. The example system provides for driving of the lubricant pump 72 in a common direction 118 regardless of which direction the fan drive shaft is being rotated.

Referring to FIGS. 4 and 5, the example shaft gear 64 is shown rotated in a second direction 70 that is opposite from the first direction 68 illustrated in FIGS. 2 and 3. Rotation of the shaft gear 64 and the direction 70 results in rotation of the primary gear 90 in a direction counter to that which would cause engagement with the primary shaft 92. Accordingly, the primary gear 90 will rotate about the primary gear shaft 92 but not transmit that torque to the primary gear shaft 92. The primary clutch 96 will allow rotation of the primary gear 90 but not transmit that torque to the primary gear shaft 92. The primary gear will drive the first reversing gear 104 to in turn drive the reversing gear shaft 110. The reversing clutch 112 will engage the reversing gear shaft 110 in this direction and thereby torque will be transferred between the reversing gear shaft 110 and the second reversing gear 106.

The transmission of the torque between the shaft 110 and the reversing gear 106 will result in torque transmission through the reversing idler gear 108 and thereby further communication of torque through the pinion gear 98. As appreciated, the pinion gear 98 will rotate in a direction that provides rotation of the pump shaft gear 100 in the common direction 118 and thereby result in the lubricant pump generating the desired lubricant flow 84 to the geared architecture 48. Moreover, in an alternate embodiment, through a specific gear ratio between the primary gear 90 and the first reversing gear 104, reverse rotation of the fan drive gear 64 can result in a faster rotation of the pump shaft gear 100 and thereby an increased operating lubricant flow 84 generated by the lubricant pump 72.

In this example, the lubricant pump 72 may be one of a gear pump, gear rotor pump and a vane pump. Moreover the lubricant pump could be of any configuration known in the art. Moreover, with the example input gear train providing a common rotation of the pump shaft gear 100 the lubricant pump 72 is not required to have complicated lubricant passage, flow bypass or their valves to compensate for reverse operations generated by rotation of the input gear train.

Referring to FIG. 6 with continued reference to FIGS. 3 and 5, the in an embodiment, primary clutch 96 and reversing clutch 112 are overrunning clutch designs utilizing a sprag configuration. An example sprag clutch comprises an inner race 120 and outer race 122 separated by an annular space 126. Within the annular space 126 are a plurality of sprags 124. The sprags 124 are shaped such that they transmit power between the inner race 120 and outer race 122 when rotating in one direction and allow independent rotation between the two races 120, 122 when rotated in an opposite direction. Accordingly, the sprag clutch design provides for the selective coupling between the inner race 120 and the outer race 122 that is utilized to transmit torque between in one desired direction. It should be appreciated that although a sprag clutch is disclosed other clutch configurations can be utilized and are within the contemplation of this disclosure.

Accordingly, the example input drive train 66 provides for lubricant flow to the geared architecture 48 regardless of the direction in which the fan 42 and thereby the shaft gear 64 is rotating. The resulting common direction or rotation provided to the lubricant pump 72 reduces complexity and provides for the use of lubricant pumps of many different configurations. Moreover, the lubricant supply to the geared architecture 48 prevents premature wear of specific load bearing parts such as the journal bearings 80 the support the gears.

Although an example embodiment has been disclosed, a worker of ordinary skill in this art would recognize that certain modifications would come within the scope of this disclosure. Furthermore, although the embodiments herein disclosed include applications specific to gas turbine engines, it would be understood that in other embodiments the lubrication system may be implement on any gear system that requires lubrication while rotating in different directions, such as e.g. automobiles, wind turbines, hydro turbines, and other gear systems.

What is claimed is:

1. A gas turbine engine comprising: a fan section including a shaft gear disposed on a fan shaft rotatable about an axis; a fan drive gear system driving the fan shaft; a lubrication pump configured to supply a lubricant flow to the fan drive gear system; and a gear train coupled to the shaft gear and configured to drive the lubrication pump in a first direction responsive to rotation of the shaft gear in both the first direction and a second direction, the gear train having a primary gear driven by the shaft gear, the primary gear driving a pinion gear that drives a pump shaft gear when rotating in the first direction and a first reverse gear that drives a reverse idler gear that drives the pump shaft gear when the shaft gear rotates in the second direction.

2. The gas turbine engine as recited in claim 1, wherein the primary gear is coupled to drive a primary gear shaft that drives the pinion gear responsive to rotation of the fan shaft in the first direction and decouples from the primary gear shaft responsive to rotation of the fan shaft in the second direction.

3. The gas turbine engine as recited in claim 2, including a primary overrunning clutch coupling the primary gear to the primary gear shaft during rotation in the first direction.

4. The gas turbine engine as recited in claim 2, wherein the pinion gear is configured to drive the lubrication pump.

5. The gas turbine engine as recited in claim 1, wherein the first reverse gear is coupled to a reverse gear shaft responsive to rotation of the fan shaft in the second direction and decoupled from the reverse gear shaft responsive to rotation of the fan shaft in the first direction.

6. The gas turbine engine as recited in claim 5, including a reverse overrunning clutch for coupling the first reverse gear to the reverse gear shaft during rotation of the fan shaft in the second direction.

7. The gas turbine engine as recited in claim 5, including the reverse idler gear driven by the first reverse gear and configured to drive the lubrication pump.

8. The gas turbine engine as recited in claim 1, wherein the lubrication pump comprises one of a gear pump, gear rotor pump, and a vane pump.

9. The gas turbine engine as recited in claim 1, wherein the fan drive gear system includes at least one gear supported by a journal bearing.

10. A gas turbine engine comprising: a geared architecture; a fan shaft to rotate about an axis with the geared architecture; a lubrication pump configured to supply a lubricant flow to the geared architecture; and an input gear train coupled to the fan shaft and configured to drive the lubrication pump in a first direction responsive to rotation of the fan shaft in both of the first direction and a second direction, the input gear train having a primary gear driven by a shaft gear disposed on the fan shaft, the primary gear driving a pinion gear that drives a pump shaft gear when rotating in a first direction and a first reverse gear that drives a reverse idler gear that drives the pump shaft gear when the shaft gear rotates in the second direction.

11. The gas turbine engine as recited in claim 10, wherein rotation of the fan shaft in a non-powered condition of the gas turbine engine drives the input gear train in one of the first direction and the second direction.

12. The gas turbine engine as recited in claim 11, wherein the primary gear is coupled to drive a primary gear shaft through a primary clutch responsive to rotation of the fan shaft in the first direction and decoupled from the primary gear shaft responsive to rotation of the fan shaft in the second direction.

13. The gas turbine engine as recited in claim 12, wherein the first reverse gear is coupled to a reverse gear shaft through a reverse clutch responsive to rotation of the fan shaft in the second direction and decoupled from the reverse gear shaft responsive to rotation of the an fan shaft in the first direction.

14. The gas turbine engine as recited in claim 10, wherein the fan shaft is in communication with a fan, and the fan shaft rotates in each of the first direction and the second direction responsive to fan windmilling.

15. A method of lubricating a geared architecture comprising: driving a lubricant pump responsive to rotation of a fan shaft in a non-powered condition; and generating a lubricant flow with the lubricant pump to portions of a geared architecture; wherein the lubricant pump generates the lubricant flow responsive to the fan shaft rotating in a first or second direction.

16. The method as recited in claim 15, including rotating a primary gear with a gear disposed on the fan shaft, the primary gear driving a pinon gear that drives a pump shaft gear of the lubricant pump when rotating in a first direction and a first reverse gear that drives a reverse idler gear that drives the pump shaft gear upon rotation of the fan shaft in a second direction.

17. The method as recited in claim 15, including directing lubricant flow from the lubricant pump to at least one journal bearing.

* * * * *